2 Sheets—Sheet 1.

C. W. & W. W. MARSH.
HARVESTER-REEL.

No. 189,566.  Patented April 17, 1877.

Witnesses:
O. W. Bond
J. F. Bruns

Inventors:
Chas. W. Marsh
Wm. W. Marsh
By West & Bond Attys

2 Sheets—Sheet 2.
C. W. & W. W. MARSH.
HARVESTER-REEL.
No. 189,566. Patented April 17, 1877.
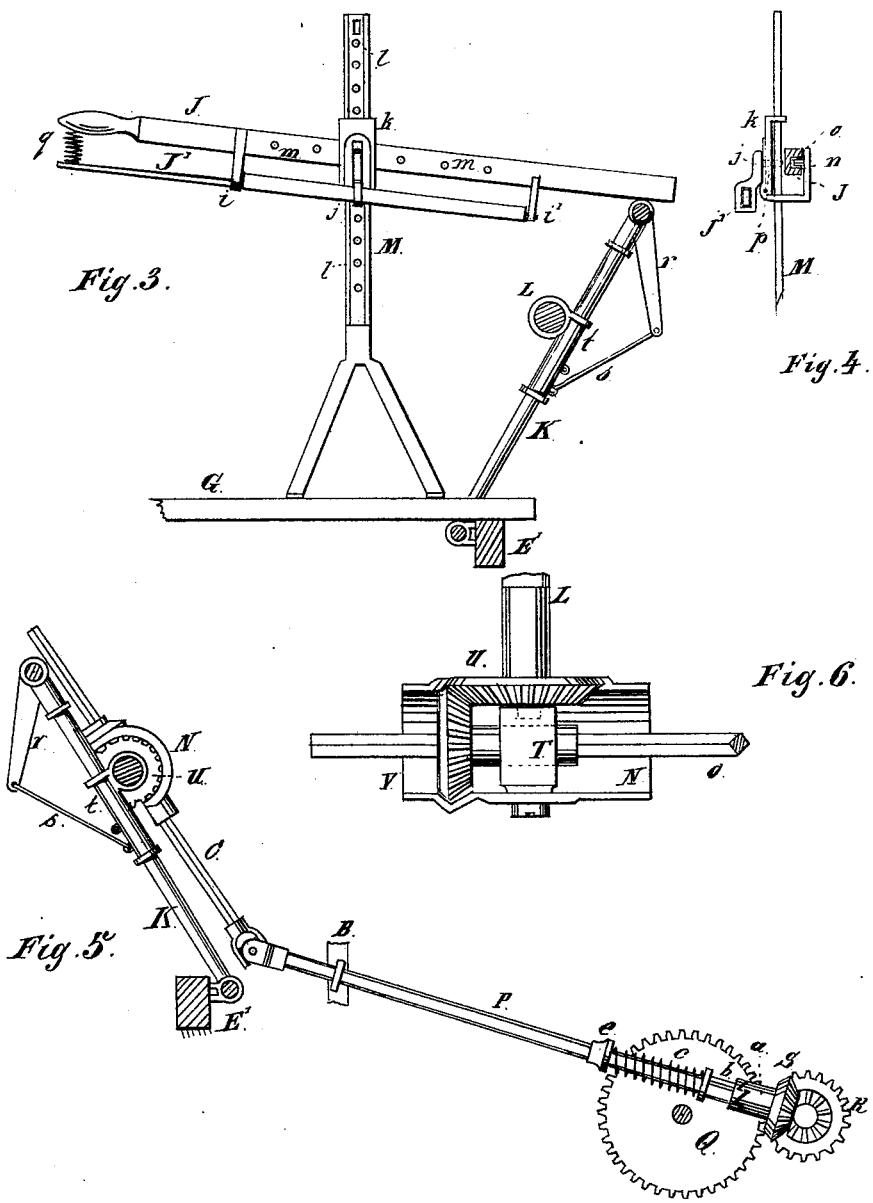
Witnesses:
O. W. Bond
H. F. Bruns
Inventors:
Chas. W. Marsh
Wm. W. Marsh
By West & Bond Attys.

UNITED STATES PATENT OFFICE.

CHARLES W. MARSH AND WILLIAM W. MARSH, OF SYCAMORE, ILLINOIS.

IMPROVEMENT IN HARVESTER-REELS.

Specification forming part of Letters Patent No. 189,566, dated April 17, 1877; application filed September 28, 1876.

*To all whom it may concern:*

Be it known that we, CHARLES W. MARSH and WILLIAM W. MARSH, of Sycamore, De Kalb county, State of Illinois, have invented new and useful Improvements in Harvesters, of which the following is a full description, reference being had to the accompanying drawings, consisting of two sheets, in which—

Figure 1:
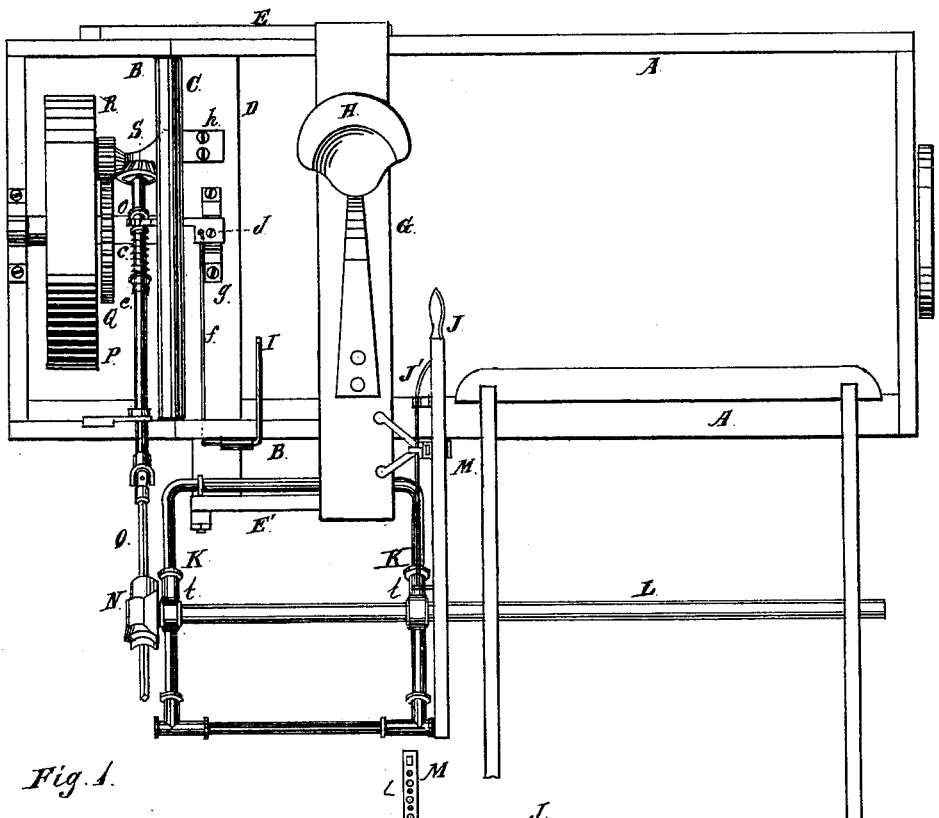
Figure 2:
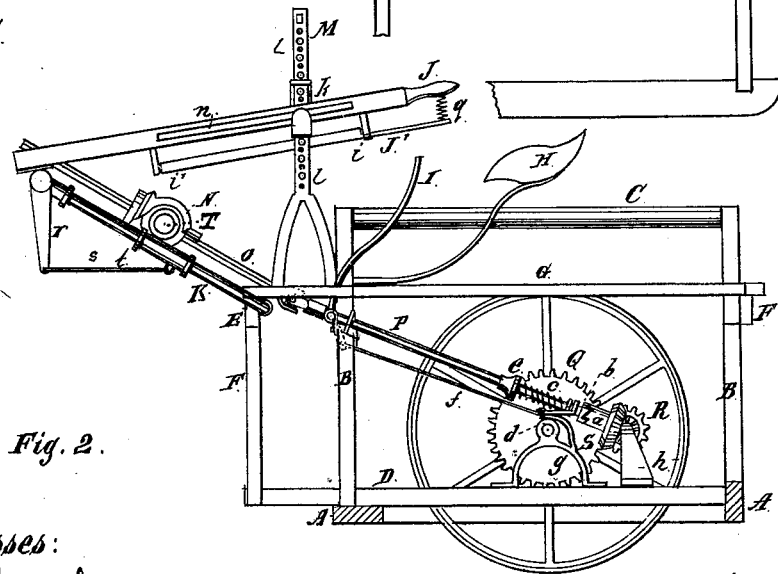

Figure 1 is a top or plan view; Fig. 2, a cross-section on line $x\ x$ of Fig. 1; Fig. 3, an enlarged view of the lever, and standard for adjusting the reel; Fig. 4, a detail of the lock; Fig. 5, an enlarged view of the devices for driving the reel; Fig. 6, an under side view of the gear-cap enlarged.

The objects of this invention are to adjust the reel up and down and forward and back by a single lever; to hold the lever in position by a single lock; to keep grass and short straws from interfering with the gear for driving the reel; to attach the reel, so that the machine can be run without operating the reel, and without unbelting or disconnecting its driving mechanism; and, also, so that when the machine is backed in gear, the reel shall not run backward, thus avoiding injury to it, and to so arrange the reel that it can be thrown into and out of operation by the driver at any time; and its nature consists in constructing the lever for operating the reel in two parts, operating upon opposite sides of a standard or locking-post; in applying a movable cap to the sliding bearing of the driving-shaft; and in applying a clutch to the driving-shaft of the reel.

In the drawings, A represents the main frame; B, an elevator-frame; C, the upper roller of the elevator; D, the cross-bar of the main frame, projecting out in front; E E', the bars supporting the driver's platform; F, the supports for the bar E'; G, the driver's platform; H, the driver's seat; I, the lever for operating the clutch; J J', the reel-lever; K, the swinging frame upon which the reel is supported; L, the reel-shaft; M, the standard or locking-post for the reel-lever; N, the sliding cap; O P, the rods, coupled together by a universal joint, for driving the reel; Q R S, the gear-wheels for operating the reel from the main or driving-wheel; T, the sliding bearing of the driving-shaft; U V, the miter-wheels for driving the reel-shaft; $a\ b$, the clutch; $c$, the spring for forcing the clutch into position; $d$, the lever for releasing the clutch; $e$, the collar against which the end of the spring rests; $f$, the rod for operating, by means of the lever I, the clutch-lever $d$; $g$, the inner bearing of the driving-wheel, upon which the lever $d$ is mounted; $h$, the support for the gear-wheels R S; $i\ i'$, the bearings for the section J' of the reel-lever; $j$, the locking arm and pin; $k$, the sliding collar; $l$, the holes in the standard M; $m$, the holes in the lever J; $n$, the slot on the opposite side of the lever J; $o$, the pin operating in the groove $n$; $p$, the pivot of the locking-bar $j$; $q$, the spring between the sections J J' of the reel-lever; $r$, the arm of the lever J, projecting over the reel-frame $k$; $s$, the rod connecting the sliding bearing of the reel-shaft with the arm $r$; $t$, the sliding bearing of the reel-shaft.

The frame A B is provided with any suitable carrier and elevator, and also with a sickle and other appliances necessary to make a complete harvester.

The cross-bar D of this frame is extended in front sufficiently far to support the bar E', to which the reel-frame is attached, and in addition to the support F, shown, one or more braces may be applied, from the bar D or frame A, to give the bar E' additional support, as may be necessary to give steadiness to the frame K.

The frame K is made of gas-pipe or an iron rod, bent so as form the two arms, and coupled together, as shown. On these arms the sliding bearings $t$ are placed, so as to give the reel a firm support, and at the same time allow the bearing to be slid up and down on the arms by means of the lever J and arm $r$ and rod $s$, which give a vertical or up-and-down adjustment of the reel, and by swinging the frame K upon its hinges or connection the reel is adjusted laterally, or forward and back.

The reel is driven by the jointed shaft O P. The gear-wheel V is provided with a shaft, having an angular opening, so that while it may slide up and down on the section O of the driving-rod, it turns with it. The shaft or collar of the wheel V passes through and is journaled to the block T. On the top of this block is fastened the cap N, which is made to fit over the wheels U V, as shown, and slide up and down the shaft O with the gearing. This cap prevents the grass or short grain from getting into the gearing or interfering with its operation.

The standard M is made and attached to the machine in any suitable manner, to give it sufficient strength to hold the reel, and it is provided with a series of holes, $l$, which pass clear through it.

The lever J is made in two parts. The upper section or main lever J is provided on its inner face or part next to the standard with a series of holes or indentations, $m$, and on its opposite side with a slot, $n$, extending part way through it, (shown at Figs. 2 and 4,) in which slot the pin $o$, attached to the bent arm of the slide $k$, operates. The lower section J' of the lever is pivoted to the main lever J by the arms $i\ i'$. This section J' passes through an opening in the lower end of the lock $j$, sufficiently loose or free to enable it to slide backward and forward through it. Its outer end is curved around so as to bring it under the main lever J, as shown at Fig. 1. Between the outer ends of the sections J J' the spring $q$ is located, so as to keep them apart, and keep the lock $j$ in position.

The operation of this part of the machine is as follows:

By grasping the ends of the sections J J' and compressing the spring $q$ the pin at the upper end of the lock $j$ is drawn or thrown out, which leaves the lever free to move up and down, or back and forth. As soon as the proper position is reached the lower section J' is released, when the pin of the lock $j$ passes through one of the holes $l$. The lever J is then moved lengthwise until the same pin passes into one of the holes $m$, whereby the lever is locked in both positions by a single pin, operated from the same lever.

It will be seen that after the position of the sliding collar $k$ is adjusted upon the standard M and locked by the pin of the lock-bar $j$, the lever may still be raised or depressed as it bears upon the pin $o$ in the slot $n$, and the lever may also, after being locked in its vertical position, be slid backward and forward until the exact position desired for the reel is obtained.

By making the sections J J' to operate upon opposite sides of the standard M, and connecting the two sections together by the arms $i\ i'$, a space is formed.

To prevent the lever J from being lifted over the standard, a permanent pin may be left in the upper one of the holes $l$, or a suitable projection for that purpose may be made a part of the standard.

By applying the clutch $a\ b$ to the shaft P the driver, by means of the lever I, and rod $f$ and lever $d$, can throw the reel out of operation at any time; and by holding the clutch in place by means of the spring $c$, whenever the machine is moved backward, the movement of the reel is not reversed, as the clutch slips and allows the reel to stand still; and in case the adjustment of the reel-slats becomes disturbed, the reel can be moved around by the driver or otherwise, without moving the machine or disconnecting the driving parts, which, in practice, will be found a great advantage, not only in determining which of the slats is out of position, but also in preventing the breakage by the hitting of the slats against the machine.

What we claim as new, and desire to secure by Letters Patent, is as follows:

1. The sliding cap N, in combination with the sliding bearings T $t$, reel-supporting arm, shaft O, and wheels U V, substantially as and for the purposes specified.

2. The sliding collar $k$, arm $j$, and lever J J', in combination with the post M, substantially as and for the purpose specified.

3. The combination of the lever J J', the section J, having holes $m$, with the standard M, having holes $l$, and locking-arm $j$, substantially as and for the purpose described.

4. The lever J, having the slot $n$, in combination with the pin $o$, and sliding collar $k$, whereby the reel may be vertically adjusted at any point of its forward and backward adjustment, substantially as described.

5. The combination of the lever J, having holes $m$, and slot or groove $n$, pivoted bar J', spring $q$, lock $j$, sliding collar $k$, and pin $o$, with the standard M, having holes $l$, and pivoted reel-support K, substantially as and for the purposes specified.

6. The reel-driving shaft P, in combination with the clutch $a\ b$, spring $c$, lever $d$, rod $f$, lever I, and wheels R S, whereby the reel has an independent attachment to the main driving-shaft, and does not revolve when the machine runs backward, and can be thrown out of operation altogether at will, substantially as set forth.

CHARLES W. MARSH.
WILLIAM W. MARSH.

Witnesses:
H. McINTYRE,
A. M. STARK.